US010534585B1

(12) United States Patent
Eberlein et al.

(10) Patent No.: US 10,534,585 B1
(45) Date of Patent: Jan. 14, 2020

(54) INTEGRATED DEVELOPMENT ENVIRONMENT WITH DEEP INSIGHTS AND RECOMMENDATIONS

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/173,225

(22) Filed: Oct. 29, 2018

(51) Int. Cl.
G06N 20/00 (2019.01)
G06F 17/18 (2006.01)
G06N 5/04 (2006.01)
G06F 8/33 (2018.01)

(52) U.S. Cl.
CPC .............. G06F 8/33 (2013.01); G06F 17/18 (2013.01); G06N 5/04 (2013.01); G06N 20/00 (2019.01)

(58) Field of Classification Search
CPC ........... G06F 8/33; G06F 17/18; G06N 20/00; G06N 5/04
USPC ....................................................... 717/110
See application file for complete search history.

(56) References Cited

U.S. PATENT DOCUMENTS

| | | | |
|---|---|---|---|
| 7,523,142 B2 | 4/2009 | Driesen et al. |
| 7,657,575 B2 | 2/2010 | Eberlein et al. |
| 7,720,992 B2 | 5/2010 | Brendle et al. |
| 7,734,648 B2 | 6/2010 | Eberlein |
| 7,739,387 B2 | 6/2010 | Eberlein et al. |
| 7,894,602 B2 | 2/2011 | Mueller et al. |
| 7,962,920 B2 | 6/2011 | Gabriel et al. |
| 7,971,209 B2 | 6/2011 | Eberlein et al. |
| 8,126,919 B2 | 2/2012 | Eberlein |
| 8,200,634 B2 | 6/2012 | Driesen et al. |
| 8,225,303 B2 | 7/2012 | Wagner et al. |
| 8,250,135 B2 | 8/2012 | Driesen et al. |
| 8,291,038 B2 | 10/2012 | Driesen |
| 8,301,610 B2 | 10/2012 | Driesen et al. |
| 8,302,160 B2 | 10/2012 | Hofmann et al. |
| 8,316,422 B2 | 11/2012 | Hofmann et al. |
| 8,321,678 B2 | 11/2012 | Hofmann et al. |
| 8,356,010 B2 | 1/2013 | Driesen |
| 8,375,130 B2 | 2/2013 | Eberlein et al. |
| 8,380,667 B2 | 2/2013 | Driesen |
| 8,392,573 B2 | 3/2013 | Lehr et al. |
| 8,402,086 B2 | 3/2013 | Driesen et al. |

(Continued)

OTHER PUBLICATIONS

U.S. Appl. No. 14/960,983, filed Dec. 7, 2015, Eberlein, et al.

(Continued)

Primary Examiner — John Q Chavis
(74) Attorney, Agent, or Firm — Fish & Richardson P.C.

(57) ABSTRACT

At an Operational Insights and Development Recommendation (OIDR) system, development artifacts from a central artifacts repository are received. At the OIDR system, statistical data from a central data analysis infrastructure is received. The statistical data is retrieved from application systems running software created from the development artifacts, and the statistical data is correlated with the development artifacts. Data insights and recommendations based on the correlated statistical data and development artifacts are provided by the OIDR system to an enhanced integrated development environment (IDE). Recommendations are derived using an analysis algorithm.

20 Claims, 7 Drawing Sheets

(56) References Cited

U.S. PATENT DOCUMENTS

| | | |
|---|---|---|
| 8,407,297 B2 | 3/2013 | Schmidt-Karaca et al. |
| 8,434,060 B2 | 4/2013 | Driesen et al. |
| 8,467,817 B2 | 6/2013 | Said et al. |
| 8,473,942 B2 | 6/2013 | Heidel et al. |
| 8,479,187 B2 | 7/2013 | Driesen et al. |
| 8,543,994 B2 | 9/2013 | de Boer et al. |
| 8,555,249 B2 | 10/2013 | Demant et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,604,973 B2 | 12/2013 | Schmidt-Karaca et al. |
| 8,612,406 B1 | 12/2013 | Said et al. |
| 8,645,483 B2 | 2/2014 | Odenheimer et al. |
| 8,706,772 B2 | 4/2014 | Hartig et al. |
| 8,751,573 B2 | 6/2014 | Said et al. |
| 8,762,731 B2 | 6/2014 | Engler et al. |
| 8,762,929 B2 | 6/2014 | Driesen |
| 8,793,230 B2 | 7/2014 | Engelko et al. |
| 8,805,986 B2 | 8/2014 | Driesen et al. |
| 8,868,582 B2 | 10/2014 | Fitzer et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,924,565 B2 | 12/2014 | Lehr et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,026,502 B2 | 5/2015 | Driesen et al. |
| 9,026,857 B2 | 5/2015 | Becker et al. |
| 9,031,910 B2 | 5/2015 | Driesen |
| 9,032,406 B2 | 5/2015 | Eberlein |
| 9,069,832 B2 | 6/2015 | Becker et al. |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,183,540 B2 | 11/2015 | Eberlein et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,256,840 B2 | 2/2016 | Said et al. |
| 9,262,763 B2 | 2/2016 | Peter et al. |
| 9,274,757 B2 | 3/2016 | Said et al. |
| 9,275,120 B2 | 6/2016 | Mayer et al. |
| 9,724,757 B2 | 8/2017 | Barrett |
| 2003/0172076 A1* | 9/2003 | Arnold ................. G06F 16/2453 |
| 2006/0037000 A1* | 2/2006 | Speeter ................. H04L 67/125 |
| | | 717/120 |
| 2007/0180455 A1* | 8/2007 | Mariani ..................... G06F 8/73 |
| | | 719/328 |
| 2008/0004722 A1* | 1/2008 | Al-Attar ............ G05B 13/0275 |
| | | 700/50 |
| 2008/0120129 A1 | 5/2008 | Seubert et al. |
| 2010/0153341 A1 | 6/2010 | Driesen et al. |
| 2010/0299305 A1* | 11/2010 | Laxman ..................... G06F 8/71 |
| | | 707/609 |
| 2011/0041120 A1* | 2/2011 | Nagappan ................. G06F 8/77 |
| | | 717/126 |
| 2013/0325672 A1 | 12/2013 | Odenheimer et al. |
| 2013/0332424 A1 | 12/2013 | Nos et al. |
| 2013/0346917 A1* | 12/2013 | Bragdon ............ G06F 11/3419 |
| | | 715/802 |
| 2014/0047319 A1 | 2/2014 | Eberlein |
| 2014/0101099 A1 | 4/2014 | Driesen et al. |
| 2014/0108440 A1 | 4/2014 | Nos |
| 2014/0164963 A1 | 6/2014 | Klemenz et al. |
| 2014/0325069 A1 | 10/2014 | Odenheimer et al. |
| 2014/0359594 A1 | 12/2014 | Erbe et al. |
| 2014/0379677 A1 | 12/2014 | Driesen et al. |
| 2015/0006608 A1 | 1/2015 | Eberlein et al. |
| 2015/0100546 A1 | 4/2015 | Eberlein et al. |
| 2015/0178332 A1 | 6/2015 | Said et al. |
| 2015/0378692 A1* | 12/2015 | Dang ........................ G06F 8/36 |
| | | 717/106 |
| 2016/0307345 A1* | 10/2016 | Cardno .................. G06Q 40/04 |
| 2017/0025441 A1 | 1/2017 | Mori |
| 2017/0168870 A1* | 6/2017 | Allan ..................... G06F 9/4881 |
| 2017/0236081 A1* | 8/2017 | Grady Smith ..... G06Q 10/0637 |
| | | 705/7.36 |
| 2018/0129480 A1* | 5/2018 | Germanakos ............. G06F 8/20 |
| 2018/0189701 A1* | 7/2018 | Chang ................... G06F 12/084 |
| 2018/0232211 A1* | 8/2018 | Maurya ..................... G06F 8/33 |

OTHER PUBLICATIONS

U.S. Appl. No. 15/083,918, filed Mar. 29, 2016, Eberlein, et al.
U.S. Appl. No. 15/087,677, filed Mar. 31, 2016, Eberlein, et al.
U.S. Appl. No. 15/356,190, filed Nov. 18, 2016, Eberlein, et al.
U.S. Appl. No. 15/581,459, filed Apr. 28, 2017, Eberlein, et al.
U.S. Appl. No. 15/593,830, filed May 12, 2017, Eberlein, et al.
U.S. Appl. No. 15/847,627, filed Dec. 19, 2017, de Boer, et al.
U.S. Appl. No. 15/970,499, filed May 3, 2018, Eberlein, et al.

* cited by examiner

FIG. 3B

INTEGRATED DEVELOPMENT ENVIRONMENT WITH DEEP INSIGHTS AND RECOMMENDATIONS

BACKGROUND

Developers can use an integrated development environment (IDE) to create software. An IDE typically consists of a software source code editor, build automation tools, and a debugger, and is designed to maximize programmer productivity by providing functionalities such as ease coding, when compared to a plain text editor, such as syntax highlighting; command-completion; and building processes, interfaces for a software source code management system, and unit test infrastructure. Additional information from running applications can also be used to improve a software development process.

SUMMARY

The present disclosure describes methods and systems, including computer-implemented methods, computer program products, and computer systems for analyzing and associating statistical data that is associated with development artifacts and used to provide recommendations for improvement of the development artifacts.

In an implementation, at an Operational Insights and Development Recommendation (OIDR) system, development artifacts from a central artifacts repository are received. At the OIDR system, statistical data from a central data analysis infrastructure is received. The statistical data is retrieved from application systems running software created from the development artifacts, and the statistical data is correlated with the development artifacts. Data insights and recommendations based on the correlated statistical data and development artifacts are provided by the OIDR system to an enhanced integrated development environment (IDE). Recommendations are derived using an analysis algorithm.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented so as to realize one or more of the following advantages. First, a disclosed data analysis and association system allows production insight data to be correlated with software code analysis to recommend software code improvement. Under the described approach, developers can be provided with new insights to create superior software code, and supported to require less iterations to write "good software code". Second, the described approach also goes beyond prior innovations in this area that behave more like a tailored search engine for software code samples than a recommendation system providing deep insights based on usage data in combination with software code insights. Third, due to the software code analysis and test analysis functionality, the production insight data can be processed to recommend software code improvements, in a way that is tailored to the specific needs of the usage based on usage data in combination with software code insights.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

FIG. 3B is an illustration of a sub-portion of the example view of FIG. 3A, according to some implementations of the present disclosure.

Like reference numbers and designations in the various drawings indicate like elements.

DETAILED DESCRIPTION

Figure 1:
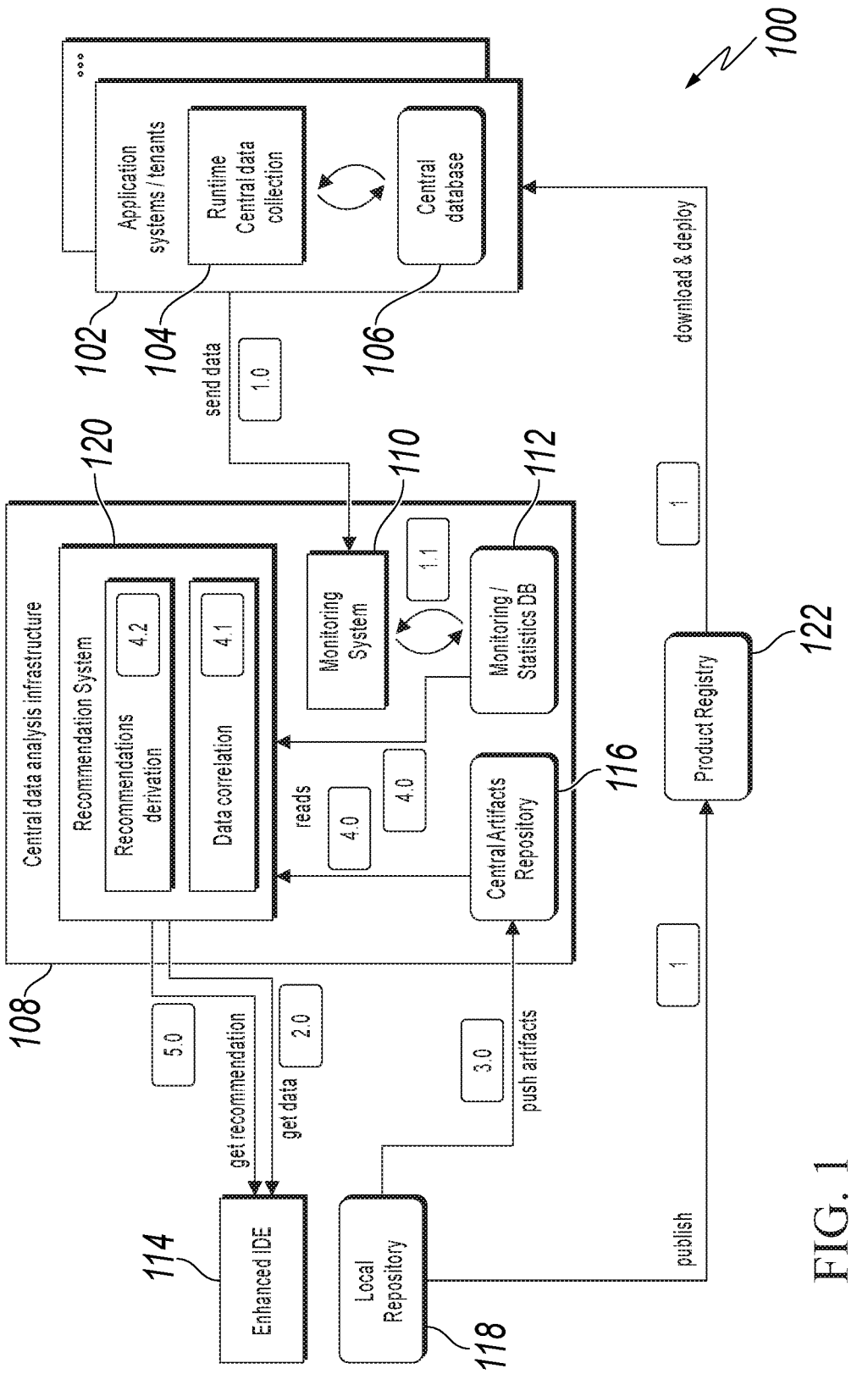
FIG. 1 is a block diagram illustrating component/data relationships for an enhanced integrated development environment (IDE) framework that employs a real-time data analysis and association system, according to an implementation of the present disclosure.

The following detailed description describes data analysis and association in an integrated development environment (IDE) and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

IDEs are software packages that provide comprehensive support to developers, such as for coding, testing, and debugging. IDEs can assist developers with managing their development projects through a single dashboard with functionalities such as syntax highlighting and aid in editor; documentation look-up; flexible and configurable build support, and packaging and deployment options. Most modern IDEs offer intelligent software code completion features. Software code insight is one of the most helpful tools that an IDE can provide, which is the ability for the IDE to interpret what is typed out. Another feature of IDEs is the ability to debug the software code. Since testing (for example, debugging, function testing, and load testing) is one of the most important tools with respect to deploying a successful software program (or application) based on the software code, testing provides developers with an ability to execute software programs, stopping the software program execution at specified points to check values of variables or other data as needed, to verify that the software program and associated functions are running as intended.

Several problems exist in with current IDE functions. First, for example, with the current IDEs, developers are often provided limited insights into ultimate use of their software program. Production use of a software program can differ from testing use of the software product, especially with some applications of a software program, which can deal with massive request loads and data volume in production use. In these instances, testing environments can fail to adequately simulate real-world-type operations. As a result, developers face a challenge in that it is difficult to assess an impact of changes in a software program with respect to actual operational use.

Further, under current IDE frameworks, developers must look for information regarding software programs in several places if they wish to receive information regarding how developed software code is applied in the software programs. For example, to analyze software code operations and to collect relevant data, developers typically have to work through other computer infrastructures by searching for information and mapping the information to a created software code artifact. Such a process is cumbersome and requires additional actions from the developers. Because data is available only if the developers actually search for the information, information search/data analysis is often skipped as unnecessary or simply due to a lack of time or other resources.

In addition, although current IDEs can provide "dependency analysis" (that is, how a change of particular software code affects other software code dependent upon the particular software code), the current IDEs do not offer support to analyze impact(s) on actual production environments due to the change in the particular software code. Therefore, under the current IDEs, developers have to analyze the impact of changes made to the software code with respect to production usage but leveraging data resources and without full knowledge of actual production operations. For example, questions from developers during production, such as "Can I delete this column from the database table?", "Is the column used by customers?", "How many entities are there?", and "If I want to migrate data, do I have to deal with 100 records or a 100 billion records?" cannot be answered by the current IDEs.

Described is a data analysis and association system with an enhanced IDE that can provide additional information from running software programs can be used to simplify software developer tasks and enable creation of better software code with less overall iterations. Here, "better" is used in the sense of improved performance, less resource usage, easier to extend, and less impact of a software change to production. The described solution takes into account both design-time data and production/runtime data, and the information is obtained directly from a context in which the software developers are working. The subject matter contained in this disclosure is twofold. First, it can provide production information to a software developer by providing insights in an IDE such as usage, performance, or average table size, so that the information can be accessible for the software developer directly in the development tool used to create the software code, instead of through a second computing infrastructure. In contrast, current IDEs only show data that is related to an artifact currently shown in the IDE, for example, if Table T is edited in the IDE, only the information regarding Table T is shown in the IDE. Second, the provided solution can derive and present recommendations for better software code by analyzing a combination of production information and software code insights. For example, if a search result performed on a database column is bad, and there is no index available with respect to the column, the enhanced IDE can recommend to the software developer to add an index to the column to achieve better search results. In this way, the software developer can work with extended knowledge about the operations characteristics of the application and improve the applications.

In some implementations, the described data analysis and association system can be configured to instruct production systems to collect and analyze statistical data to provide data insights during operations, and to correlate the collected statistical data with respect to software development artifacts. Recommendations can then be derived based on the correlated data and development artifacts by using various analysis algorithms. In some implementations, the analysis algorithms can be "machine learning" or "artificial neural network" algorithms, software code containing expert knowledge, or statistical methods. The enhanced IDE can call both the data insights and the derived recommendations from the data analysis and association system. In some implementations, the described data analysis and association system can be configured to allow data to be provided from a vendor (such as, a vendor software code repository, software code artifact analysis, or test coverage data), or to read data from deployed computing systems (for example, production monitoring data, customer software code modification analysis data, or customer test coverage). In this way, the data can be correlated to provide insights to the software developer, enabling the software developer to create superior software code, and to better serve requirements in production environment software deployments.

FIG. 1 is a block diagram illustrating component/data relationships for an enhanced IDE framework 100 that employs a real-time data analysis and association system, according to an implementation of the present disclosure. FIG. 1 is provided for example purposes only to enhance understanding of the presented concepts. As will be appreciated for those of ordinary skill in the art, there are a myriad of possible ways to present or to arrange the presented components, to structure their interactions, or to describe inter/intra-component interactions/communications. In as far as they are consistent with this disclosure, the other possible presentations or arrangements, structures, or descriptions are considered to be within the scope of this disclosure.

At a high-level and in some implementations of the described enhanced IDE framework 100, a production operation system 102 (for example, application systems or tenants running software) is used to collect (for example, through runtime central data collection 104) and to store data information associated with development artifacts for further processing and analysis. In some implementations, the data is collected by a monitoring agent reading data from operating system, database (for example, an in-memory database such as SAP HANA), and application server (for example, SAP ABAP). The database and application server provide monitoring application programming interfaces (APIs) to read statistical data about runtime. For example, an ABAP system can write log entries each time some type of event occurs (such as, when a transaction or a report is called). The system then can evaluate the log entries in an aggregated form in a system report. The collected statistical data is associated with the use of the application systems or the tenants running the software, and can include, for example, performance data, data volumes, and usage statistics. The statistical data can be collected per tenant or application system, and can be stored centrally in a central database 106. The central database 106 can add information with which statistical data is related with respect to a particular application system/tenant (for example, by adding an application/system ID to the collected data to enable statistical insights regarding tenant usage). Note that an illustrated number (for example, 1.0, 2.0, and 3.0) associated with connection arrows in FIG. 1 are used for referential purposes to demonstrate at least one possible relationship between illustrated components.

Statistical data stored in the central database 106 can be further collected and stored in a central data analysis infrastructure 108, where statistical values of the collected statistical data can be calculated. The central data analysis infrastructure 108 can include a monitoring system 110 and a monitoring statistics database 112. The monitoring system 110 collects and computes statistical values of the collected statistical data, such as, average/minimum/maximum values of the tenant's usage of an application, to generate data insights associated with the collected statistical data. Both the collected statistical data and data insights are further stored in the monitoring statistics database 112.

In some implementations, the data analysis and association system can be implemented to provide data access to an enhanced IDE 114. In some implementations, the enhanced IDE 114 can access the central data analysis infrastructure 108 and request a data set for a certain development artifact. For example, the central data analysis infrastructure 108 can offer an API (not illustrated in FIG. 1) to permit reading statistical data and corresponding data insights for a particular development artifact. In this way, the enhanced IDE 114 can be extended to provide additional views for "product insights", which illustrates statistical data related to the development artifact opened in an editor view or a package explorer view.

In some implementations, the enhanced IDE framework 100 includes a central artifacts repository 116 that can be configured to contain development artifacts with the central data analysis infrastructure 108. In this way, the central data analysis infrastructure 108 can find development artifacts related to the objects shown in the enhanced IDE 114 (for example, tables selected in a view) from the central artifacts repository 116. Specifically, a local repository 118 that contains development artifact displays and edited editors associated with the IDE 114 can push corresponding development artifacts to the central artifacts repository 116, so the development artifacts stored in the central artifacts repository 116 are synchronized with the development artifacts displayed and edited in an IDE 114 editor. As such, the central data analysis infrastructure 108 can collect statistical data for the related development artifacts as well and execute a recommendation algorithm in the recommendation system 120 based on the statistical data and development artifacts that are collected from the monitoring statistics database 112 and the central artifacts repository 116, respectively. In this way, the system can derive recommendations from the statistical data and provide insights into the data by combining the statistical data with the development artifacts. In some implementations, the recommendation system 120 can read the collected statistical data and development artifacts, and then use different algorithms to compute a recommendation based on the statistical data and the development artifacts. In some implementations, the algorithms used for this purpose can be generic algorithms (for example, deep leaning algorithms), which are not necessarily designed explicitly for the use case here. The algorithms can also be "expert algorithms", which are created for a certain use case, and integrated with expert knowledge (for example, algorithms used to relate deployment runtime to table size and to change an operation to provide a recommendation for new changes). These algorithms can either be exposed directly using an API to the IDE and be used to compute the data to return on a request, or the algorithms can be configured to generate software code or a library parametrization, so that the IDE can access the generated software code with an API provided to the IDE. In other words, the algorithm can be used by the IDE to compute data upon a request or to generate software code so that the IDE can access the software code through an API.

In some implementations, once the recommendation system 120 makes a recommendation, the enhanced IDE 114 can call the recommendation system 120 to obtain recommendations for particular development artifacts. In some implementations, the local repository 118 can be configured to publish development artifacts at a product registry 122, so that a production operation system can download and deploy the development artifacts to correlate with collected statistical data within production operation systems.

Figure 2:
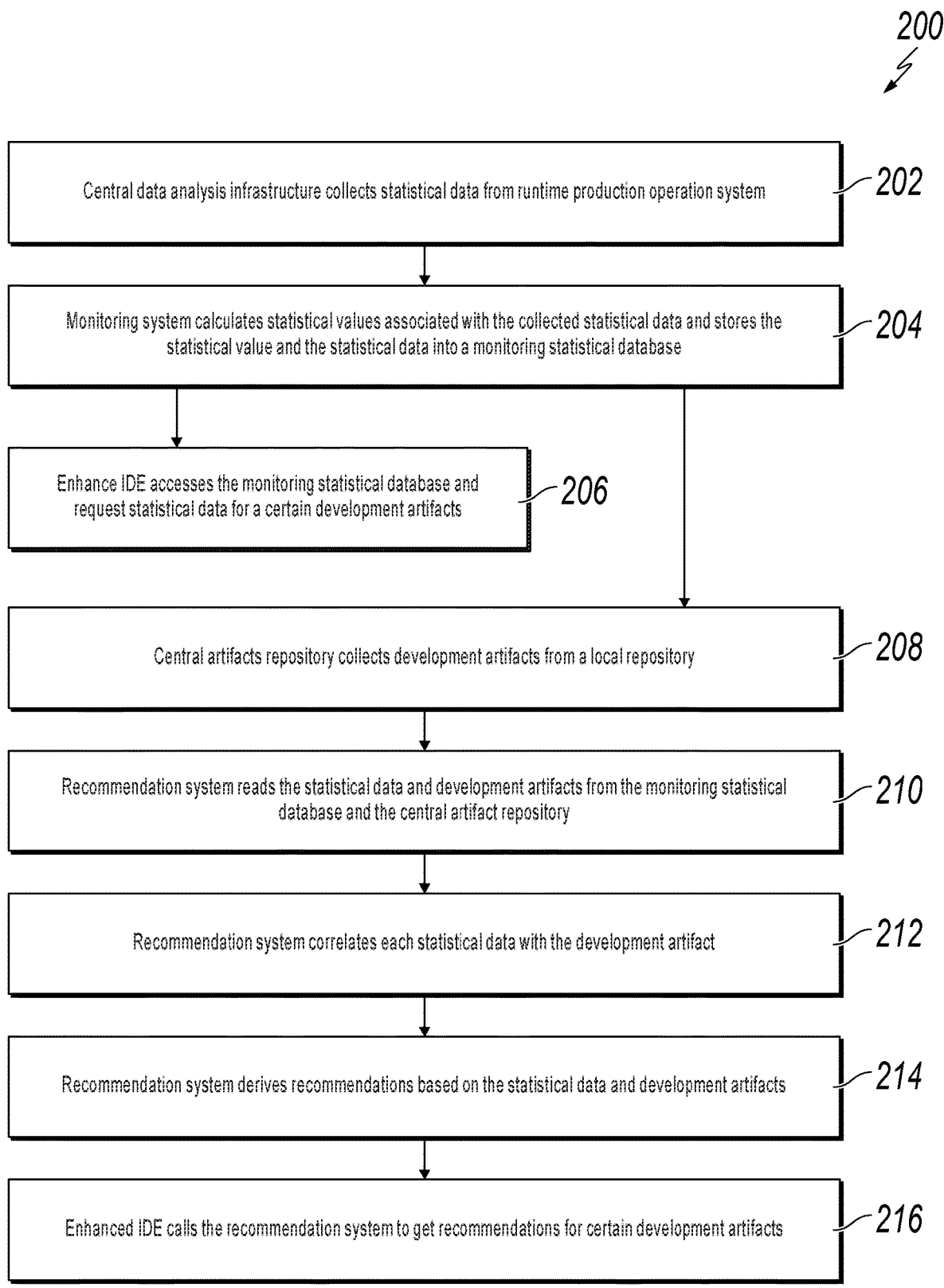
FIG. 2 is a flowchart of an example method for an enhanced IDE framework providing data access and recommendations based on a real-time data analysis and association system, according to some implementations of the present disclosure.

FIG. 2 is a flowchart of an example method 200 for an enhanced IDE framework providing data access and recommendations based on a real-time data analysis and association system, according to some implementations of the present disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 202, (1.0) a central data analysis infrastructure 108 collects statistical data from runtime production operation system 102. The statistical data is collected from runtime application systems/tenants and collected per tenant. In some implementations, the statistical data is associated with development artifacts of software running in the application systems/tenants. From 202, method 200 proceeds to 204.

At 204, (1.1) the monitoring system of the central data analysis infrastructure 108 calculates statistical values associated with the collected statistical data and stores the statistical values and the statistical data into a monitoring statistics database 112 as deep software code insights. For implementations that only provide data access, from 204, method 200 proceeds to 206. For implementations that can further provide recommendations, from 204, method 200 proceeds to 208.

At 206, (2.0) an enhanced IDE 114 accesses the monitoring statistics database 112 and requests statistical data for certain development artifacts that create software executing on the application systems/tenants. After 206, method 200 can stop.

At 208, (3.0) a central artifacts repository 116 collects development artifacts from a local repository 118 that is associated with the enhanced IDE 114. In this way, the development artifacts in the central artifacts repository 116 can be synchronized with development artifacts displayed and edited in an editor of the enhanced IDE 114. After 208, method 200 proceeds to 210.

At 210, (4.0) a recommendation system 120 reads the statistical data and development artifacts from the monitoring statistics database 112 and the central artifacts repository 116, respectively. From 210, method 200 proceeds to 212.

At 212, (4.1) the recommendation system 120 correlates each statistical data with the development artifact so that the collected statistical data is attributed with related development artifact names/IDs, allowing the addition of attributes at data specifying the development artifacts.

In some implementations, the collected data can be further aggregated and values computed (such as, average values, minimum and maximum values, and histograms) using the aggregated data. The aggregated data can also be enhanced with development artifact names/IDs for correlation operations.

In some implementations, step 212 can be skipped in situations where the development artifacts are correlated with the statistical data at runtime, as illustrated by the arrow line denoting "1". In some implementations, before monitoring system 110 collects statistical data from the production operation system 102, the local repository 118 associated with the enhanced IDE 114 publishes development artifacts at a product registry 122. After, the production operation system 102 can download and deploy the development artifacts from the product registry 122 and correlate the development artifacts with statistical data collected within the production operation system 102. From 212, method 200 proceeds to 214.

At 214, (4.2) the recommendation system 120 derives recommendations based on the statistical data and development artifacts. In some implementations, development artifact dependencies can be computed by the algorithm and read by the recommendation system 120 to derive recommendations. From 214, method 200 proceeds to 216.

At 216, (5.0) the enhanced IDE 114 can call the recommendation system 120 to get recommendations for particular development artifacts. After 216, method 200 can stop.

Figure 3A:
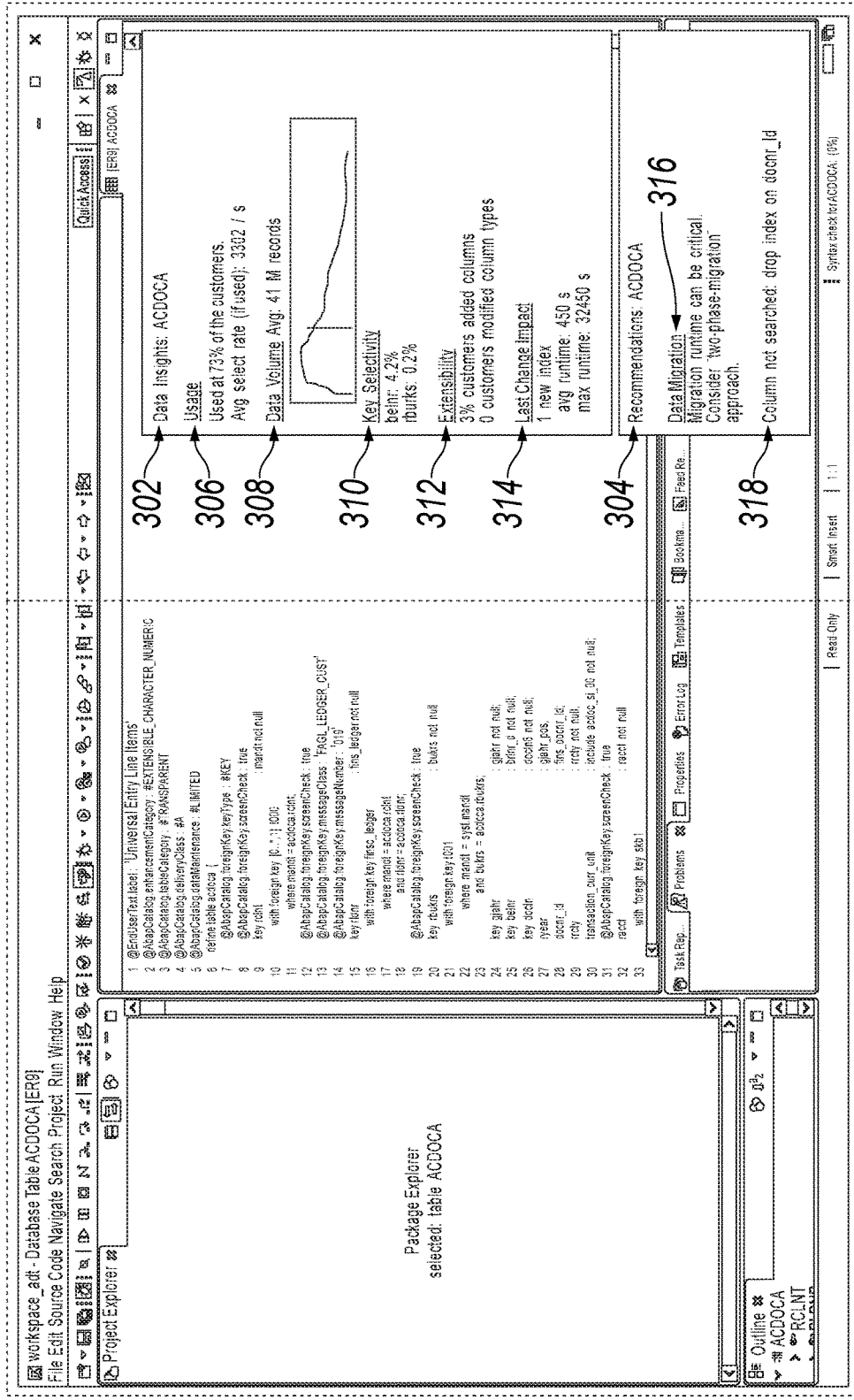
FIG. 3A is an illustration of an example view of an editor of an enhanced IDE, according to some implementations of the present disclosure.
Figure 3B:
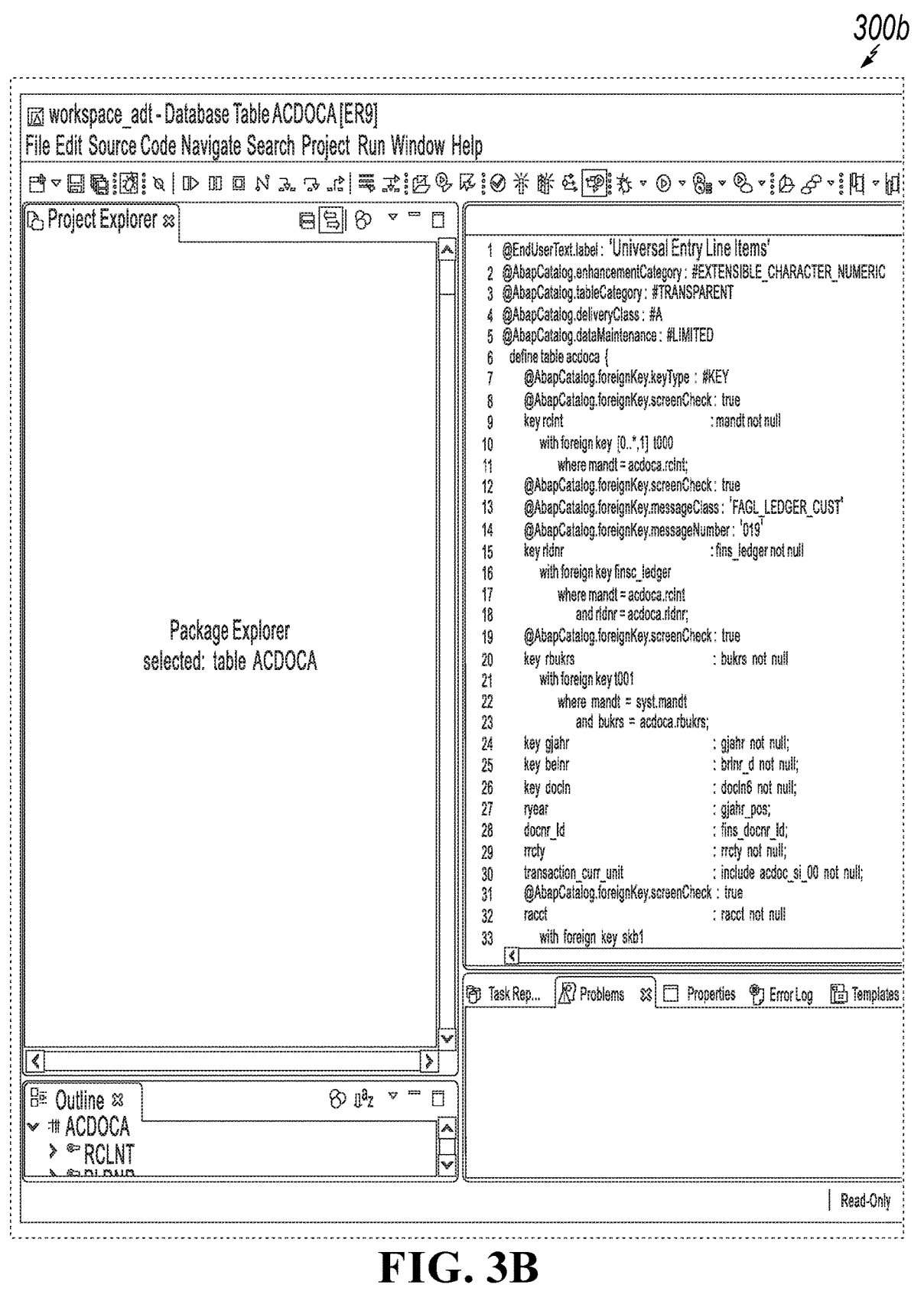
Figure 3C:
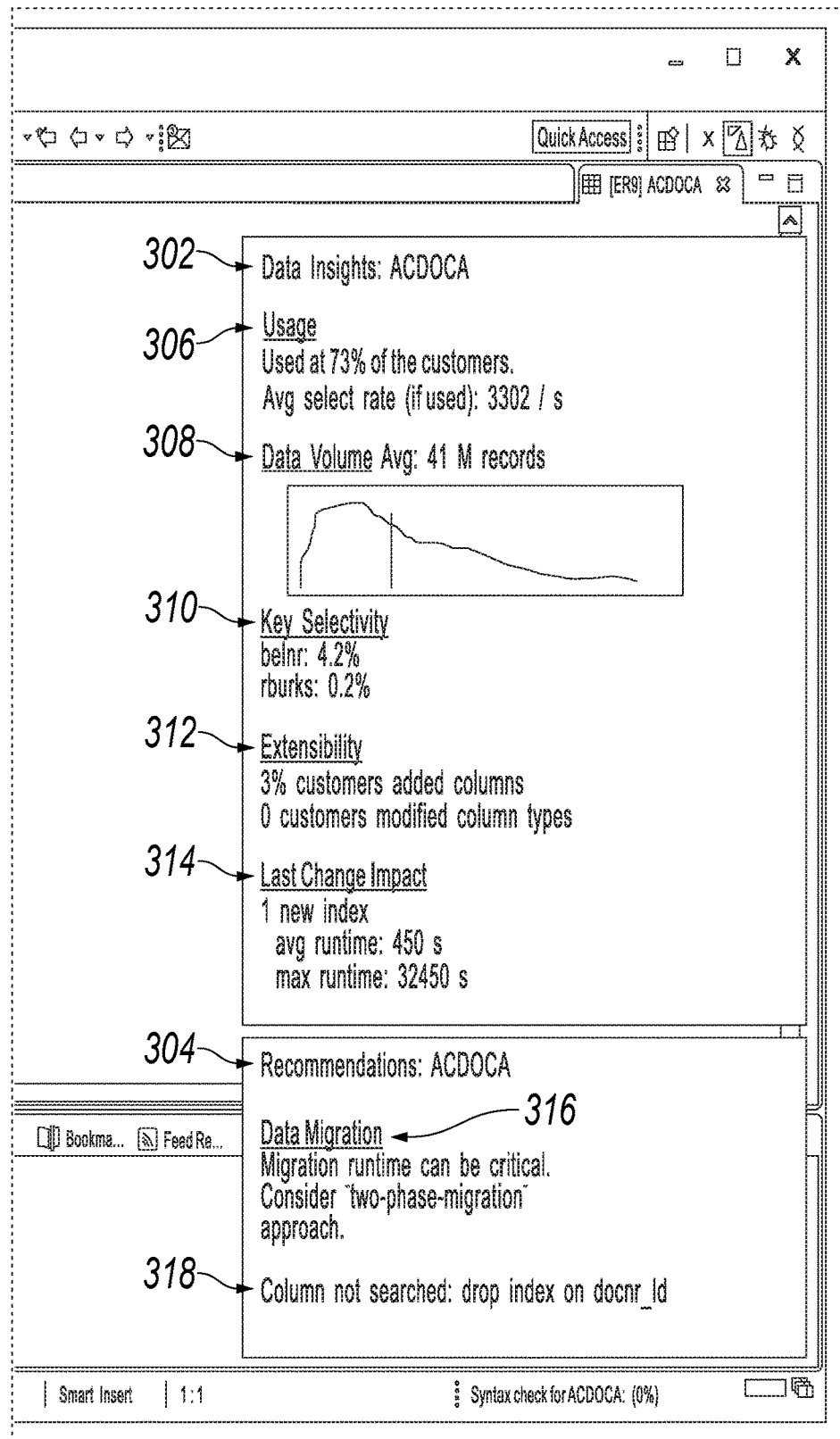
FIG. 3C is an illustration of a sub-portion of the example view of FIG. 3A, according to some implementations of the present disclosure.

FIGS. 3A-3C are illustrations 300a-300c of an example view of an editor of an enhanced IDE, according to some implementations of the present disclosure. Each of FIGS. 3B and 3C illustrates a sub-portion of FIG. 3A. The example view as illustrated in FIGS. 3A-3B is of a table editor of the enhanced IDE. As illustrated in FIG. 3C, the view 300c of the table editor comprises a data insights view 302 and a recommendation view 304.

The data insights view 302 comprises various data associated with development artifacts that create software generating the table editor. The data includes, but is not limited to usage 306, data volume 308, key selectivity 310, extensibility 312, and last change impact 314. Usage 306 is data associated with runtime usage statistics, for example, the percentage of all customers/tenants using the table, the average/minimum/maximum select rate to the table, statistics on the search, (for example, which columns are most searched, which columns are not searched at all, how often a search is run, or what the average response time of the search), As illustrated in FIGS. 3A and 3C, 73% of customers use this table and the average select rate is 3302/second. Data volume 308 is data statistics associated with the table. For example, the number of customers with data volume in certain ranges, average data volume, maximum/minimum data volume, statistics on individual table columns (for example, selectivity (that is, a percentage of how many unique values exist compared to how many pieces of data exist), especially of key columns), percentage of deployments having the table partitioned, average and maximum number of partitions, or percentage of deployments using hash/key range partitioning for the table.

As illustrated in FIG. 3A, customers select this table having 41 million records in data volume. Key selectivity 310 shows the percentage of customers selects a certain searchable column of the table. Extensibility 312 shows the extension and modification statistics, such as the percentage of customers extending the table, the percentage of customers modifying fields of the table, statistics on fields, or customer individual indexes. In this example and as illustrated in FIGS. 3A and 3C, 3% of customers chose to add columns to the table, and no customers modified the column types. Last change impact 314 represents an evaluation of an impact of a last change on products, such as migration runtime statistics, or DDL runtime statistics. In this example, the average and maximum runtime after adding a new index is 450 s and 32450 s, respectively.

Based on the data insights, recommendations can be derived, as shown in the recommendations view 304. In this example and as illustrated in FIGS. 3A and 3C, the system provided a recommendation on data migration 316, which are, first, consider a "two-phase-migration" approach, and second, drop the searchable index on the column "docn-r_ld". From the data insights last change impact 318, it can be seen that both the average and maximum runtime for adding the new index is chronologically long. Because the table is very big in production systems, migration can be critical in terms of runtime; thus the system suggests using a "two-phase-migration" approach. For the purposes of this application, "two-phase-migration" is an approach to move data migration from deployment time to usage-time between two deployments. Basically, with a first deployment, a target database structure is prepared in parallel to a productively used database structure. Code is deployed, to fill not only the productively used database structure but also the new database structure and to replicate all existing data from the productively used database structure to the new database structure. In a second deployment, the old database structure is removed and the code is updated to use the new database structure.

Likewise, because the key selectivity for the table field "rburks" is relatively low, the system recommends dropping the index defined for the column (as it is rarely used) and the index consumes resources and slows down inserts. In some implementations, based on data from cloud usage and software code-artifact analysis, and recommendations (such as "column not used/always filled with default" (for example, if column is related to an input field on a UI, suggest to drip field and enable field extensibility for customers who want to use it)), "performance" (for example, if there are search queries with lower than average performance and there are columns used in the slow search query, suggest to create a search index on these columns), "usage" (for example, if search is never used regarding certain columns and a search index is defined for these columns, suggest to drop the index), and "upon change of a type of a column in the editor of a table".

Figure 4:
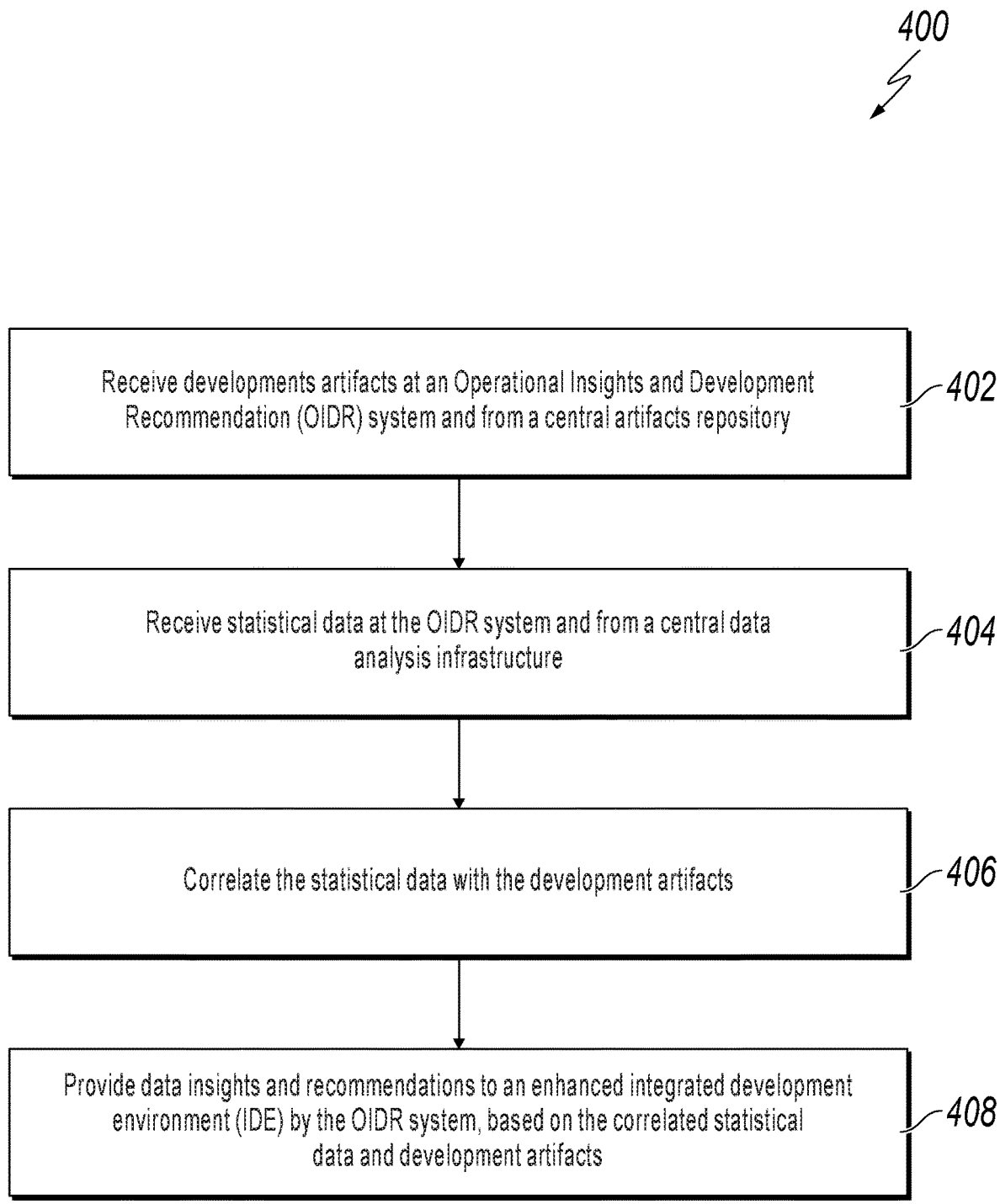
FIG. 4 is a flowchart illustrating an example of a computer-implemented method for analyzing and associating data, according to some implementations of the present disclosure.

FIG. 4 is a flowchart illustrating an example of a computer-implemented method for analyzing and associating data, according to some implementations of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402, at an Operational Insights and Development Recommendation (OIDR) system, developments artifacts are received from a central artifacts repository. In some implementations, the development artifacts include artifact definitions, attributes, and information about artifact dependencies.

In some implementations, before receiving development artifacts at the OIDR system from a central artifacts repository, at application systems, development artifacts can be received from a local repository that is associated with an enhanced IDE. The development artifacts are then correlated with statistical data collected from the application systems. After 402, method 400 proceeds to 404.

At 404, at the OIDR system, statistical data is received from a central data analysis infrastructure. In some implementations, the statistical data is retrieved from application systems running software created from the development artifacts. In some implementations, the central artifacts repository includes development artifacts that are pushed from a local repository associated with an enhanced IDE and are synchronized with development artifacts displayed and edited in one or more editors of the enhanced IDE.

In some implementations, the central data analysis infrastructure comprises a monitoring system and a monitoring statistics database, and the monitoring system collects statistical data from application systems and stores the collected statistical data to the monitoring statistics database. After 404, method 400 proceeds to 406.

At 406, the statistical data is correlated with the development artifacts. After 406, method 400 proceeds to 408.

At 408, with the OIDR system, data insights and recommendations are provided to the IDE based on the correlated statistical data and development artifacts, where the recommendations are derived using an analysis algorithm. In some implementations, the data insights and recommendations can be displayed in views of the enhanced IDE and used to edit the development artifacts.

In some implementations, the monitoring system determines data insights associated with a usage of the development artifacts by end users, and the data insights are determined by calculating statistical values of the statistical data. In such implementations, the monitoring system enhances the statistical data by artifact runtime and development artifact ID. After 408, method 400 can stop.

Figure 5:
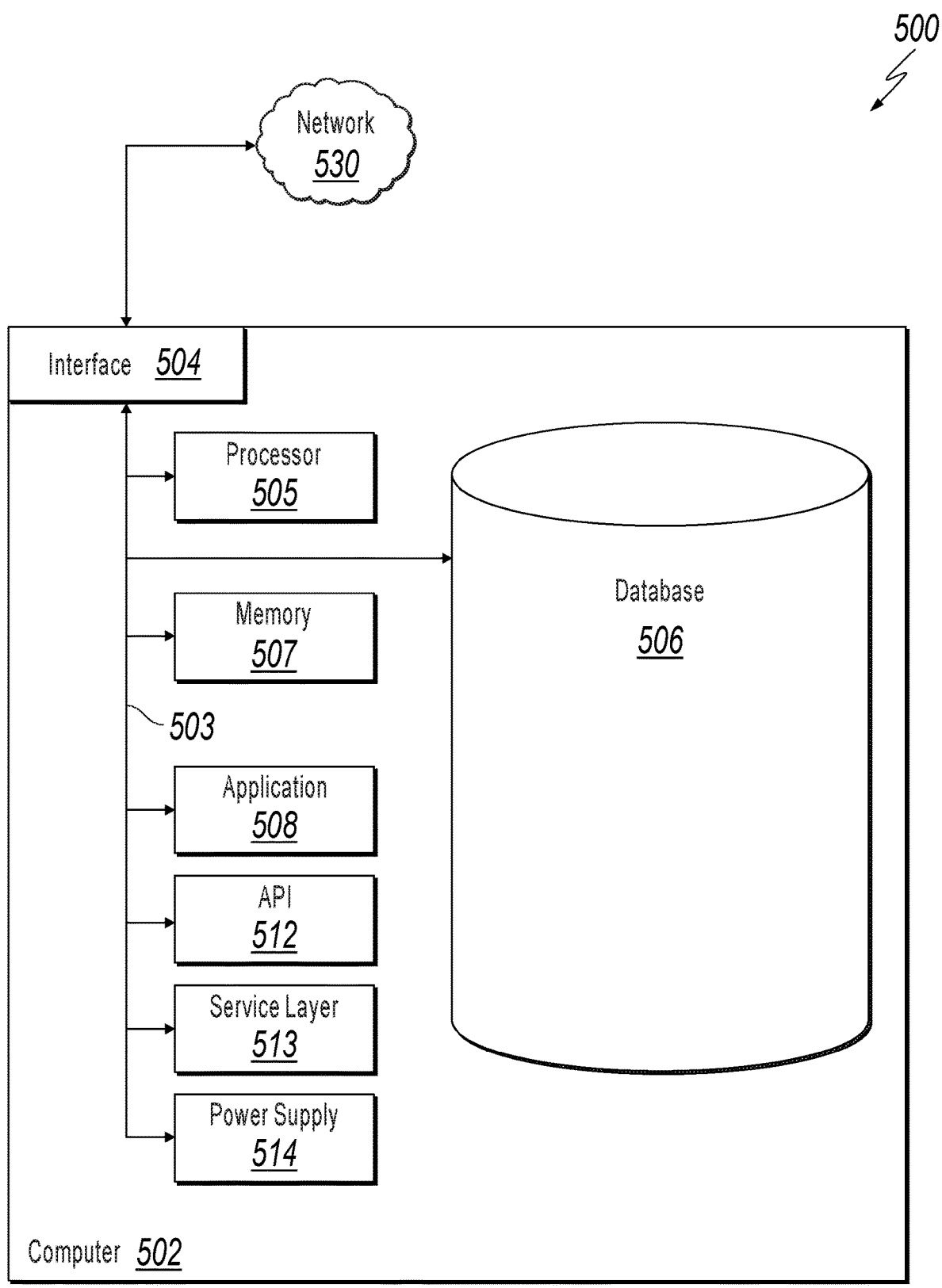
FIG. 5 is a block diagram illustrating an example of a computer-implemented system used to provide computational functionalities associated with described algorithms, methods, functions, processes, flows, and procedures, according to an implementation of the present disclosure.

FIG. 5 is a block diagram illustrating an example of a computer-implemented System 500 used to provide computational functionalities associated with described algorithms, methods, functions, processes, flows, and procedures, according to an implementation of the present disclosure. In the illustrated implementation, System 500 includes a Computer 502 and a Network 530.

The illustrated Computer 502 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 502 can include an input device, such as a keypad, keyboard, touch screen, another input device, or a combination of input devices that can accept user information, and an output device that conveys information associated with the operation of the Computer 502, including digital data, visual, audio, another type of information, or a combination of types of information, on a graphical-type user interface (UI) (or GUI) or other UI.

The Computer 502 can serve in a role in a distributed computing system as a client, network component, a server, a database or another persistency, another role, or a combination of roles for performing the subject matter described in the present disclosure. The illustrated Computer 502 is communicably coupled with a Network 530. In some implementations, one or more components of the Computer 502 can be configured to operate within an environment, including cloud-computing-based, local, global, another environment, or a combination of environments.

At a high level, the Computer 502 is an electronic computing device operable to receive, transmit, process, store, or manage data and information associated with the described subject matter. According to some implementations, the Computer 502 can also include or be communicably coupled with a server, including an application server, e-mail server, web server, caching server, streaming data server, another server, or a combination of servers.

The Computer 502 can receive requests over Network 530 (for example, from a client software application executing on another Computer 502) and respond to the received requests by processing the received requests using a software application or a combination of software applications. In addition, requests can also be sent to the Computer 502 from internal users (for example, from a command console or by another internal access method), external or third-parties, or other entities, individuals, systems, or computers.

Each of the components of the Computer 502 can communicate using a System Bus 503. In some implementations, any or all of the components of the Computer 502, including hardware, software, or a combination of hardware and software, can interface over the System Bus 503 using an application programming interface (API) 512, a Service Layer 513, or a combination of the API 512 and Service Layer 513. The API 512 can include specifications for routines, data structures, and object classes. The API 512 can be either computer-language independent or dependent and refer to a complete interface, a single function, or even a set of APIs. The Service Layer 513 provides software services to the Computer 502 or other components (whether illustrated or not) that are communicably coupled to the Computer 502. The functionality of the Computer 502 can be accessible for all service consumers using the Service Layer 513. Software services, such as those provided by the Service Layer 513, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 502, alternative implementations can illustrate the API 512 or the Service Layer 513 as stand-alone components in relation to other components of the Computer 502 or other components (whether illustrated or not) that are communicably coupled to the Computer 502. Moreover, any or all parts of the API 512 or the Service Layer 513 can be implemented as a child or a sub-module of another software module, enterprise application, or hardware module without departing from the scope of the present disclosure.

The Computer 502 includes an Interface 504. Although illustrated as a single Interface 504, two or more Interfaces 504 can be used according to particular needs, desires, or particular implementations of the Computer 502. The Interface 504 is used by the Computer 502 for communicating with another computing system (whether illustrated or not) that is communicatively linked to the Network 530 in a distributed environment. Generally, the Interface 504 is operable to communicate with the Network 530 and includes logic encoded in software, hardware, or a combination of software and hardware. More specifically, the Interface 504 can include software supporting one or more communication protocols associated with communications such that the Network 530 or hardware of Interface 504 is operable to communicate physical signals within and outside of the illustrated Computer 502.

The Computer 502 includes a Processor 505. Although illustrated as a single Processor 505, two or more Processors 505 can be used according to particular needs, desires, or particular implementations of the Computer 502. Generally, the Processor 505 executes instructions and manipulates data to perform the operations of the Computer 502 and any algorithms, methods, functions, processes, flows, and procedures as described in the present disclosure.

The Computer 502 also includes a Database 506 that can hold data for the Computer 502, another component communicatively linked to the Network 530 (whether illustrated or not), or a combination of the Computer 502 and another component. For example, Database 506 can be an in-memory, conventional, or another type of database storing data consistent with the present disclosure. In some implementations, Database 506 can be a combination of two or more different database types (for example, a hybrid in-memory and conventional database) according to particular needs, desires, or particular implementations of the Computer 502 and the described functionality. Although illustrated as a single Database 506, two or more databases of similar or differing types can be used according to particular needs, desires, or particular implementations of the Computer 502 and the described functionality. While Database 506 is illustrated as an integral component of the Computer 502, in alternative implementations, Database 506 can be external to the Computer 502. As illustrated, the Database 506 holds the previously described data types.

The Computer 502 also includes a Memory 507 that can hold data for the Computer 502, another component or components communicatively linked to the Network 530 (whether illustrated or not), or a combination of the Computer 502 and another component. Memory 507 can store any data consistent with the present disclosure. In some implementations, Memory 507 can be a combination of two or more different types of Memory (for example, a combination of semiconductor and magnetic storage) according to particular needs, desires, or particular implementations of the Computer 502 and the described functionality. Although illustrated as a single Memory 507, two or more Memories 507 or similar or differing types can be used according to particular needs, desires, or particular implementations of the Computer 502 and the described functionality. While Memory 507 is illustrated as an integral component of the Computer 502, in alternative implementations, Memory 507 can be external to the Computer 502.

The Application 508 is an algorithmic software engine providing functionality according to particular needs, desires, or particular implementations of the Computer 502, particularly with respect to functionality described in the present disclosure. For example, Application 508 can serve as one or more components, modules, or applications. Further, although illustrated as a single Application 508, the Application 508 can be implemented as multiple Applications 508 on the Computer 502. In addition, although illustrated as integral to the Computer 502, in alternative implementations, the Application 508 can be external to the Computer 502.

The Computer 502 can also include a Power Supply 514. The Power Supply 514 can include a rechargeable or non-rechargeable battery that can be configured to be either user- or non-user-replaceable. In some implementations, the Power Supply 514 can include power-conversion or management circuits (including recharging, standby, or another power management functionality). In some implementations, the Power Supply 514 can include a power plug to allow the Computer 502 to be plugged into a wall socket or another power source to, for example, power the Computer 502 or recharge a rechargeable battery.

There can be any number of Computers 502 associated with, or external to, a computer s5stem containing Computer 502, each Computer 502 communicating over Network 530. Further, the term "client", "user", or other appropriate terminology can be used interchangeably, as appropriate, without departing from the scope of the present disclosure. Moreover, the present disclosure contemplates that many users can use one Computer 502, or that one user can use multiple computers 502.

Described implementations of the subject matter can include one or more features, alone or in combination.

For example, in a first implementation, a computer-implemented method, comprising: receiving, at an Operational Insights and Development Recommendation (OIDR) system, developments artifacts from a central artifacts repository; receiving, at the OIDR system, statistical data from a central data analysis infrastructure, wherein the statistical data is retrieved from application systems running software created out of the development artifacts; correlating, the statistical data with the development artifacts; and providing, by the OIDR system, data insights and recommendations to an enhanced IDE based on the correlated statistical data and development artifacts, wherein the recommendations are derived using an analysis algorithm.

The foregoing and other described implementations can each, optionally, include one or more of the following features:

A first feature, combinable with any of the following features, wherein the development artifacts comprises artifact definitions, attributes and information about artifact dependencies.

A second feature, combinable with any of the previous or following features, wherein the data insights and recommendations are displayed in views of the enhanced IDE and are used to edit the development artifacts.

A third feature, combinable with any of the previous or following features, wherein the central artifacts repository comprises development artifacts that are pushed from a local repository associated with the enhance IDE and are synchronized with development artifacts displayed and edited in one or more editors of the enhanced IDE.

A fourth feature, combinable with any of the previous or following features, wherein the central data analysis infrastructure comprises a monitoring system and a monitoring statistics database, wherein the monitoring system collects statistical data from application systems and stores the collected statistical data to the monitoring statistics database.

A fifth feature, combinable with any of the previous or following features, further comprising the monitoring system determines data insights associated with a usage of the development artifacts by end users, wherein the data insights are determined by calculating statistical values of the statistical data.

A sixth feature, combinable with any of the previous or following features, further comprising the monitoring system enhancing the statistical data by artifacts runtime and development artifact ID.

A seventh feature, combinable with any of the previous or following features, before receiving developments artifacts at an OIDR system from a central artifacts repository: further comprising receiving, at application systems, development artifacts from a local repository that is associated with an enhanced IDE; and correlating the development artifacts with statistical data collected from the application systems.

In a second implementation, a computer-implemented system, comprising: receiving, at an Operational Insights and Development Recommendation (OIDR) system, developments artifacts from a central artifacts repository; receiving, at the OIDR system, statistical data from a central data analysis infrastructure, wherein the statistical data is retrieved from application systems running software created out of the development artifacts; correlating, the statistical data with the development artifacts; and providing, by the OIDR system, data insights and recommendations to an enhanced IDE based on the correlated statistical data and development artifacts, wherein the recommendations are derived using an analysis algorithm.

The foregoing and other described implementations can each, optionally, include one or more of the following features:

A first feature, combinable with any of the following features, wherein the development artifacts comprises artifact definitions, attributes and information about artifact dependencies.

A second feature, combinable with any of the previous or following features, wherein the data insights and recommendations are displayed in views of the enhanced IDE and are used to edit the development artifacts.

A third feature, combinable with any of the previous or following features, wherein the central artifacts repository comprises development artifacts that are pushed from a local repository associated with the enhance IDE and are synchronized with development artifacts displayed and edited in one or more editors of the enhanced IDE.

A fourth feature, combinable with any of the previous or following features, wherein the central data analysis infrastructure comprises a monitoring system and a monitoring statistics database, wherein the monitoring system collects statistical data from application systems and stores the collected statistical data to the monitoring statistics database.

A fifth feature, combinable with any of the previous or following features, further comprising the monitoring system determines data insights associated with a usage of the development artifacts by end users, wherein the data insights are determined by calculating statistical values of the statistical data.

A sixth feature, combinable with any of the previous or following features, further comprising the monitoring system enhancing the statistical data by artifacts runtime and development artifact ID.

A seventh feature, combinable with any of the previous or following features, before receiving developments artifacts at an OIDR system from a central artifacts repository: further comprising receiving, at application systems, development artifacts from a local repository that is associated with an enhanced IDE; and correlating the development artifacts with statistical data collected from the application systems.

In a third implementation, In a third implementation, a computer-implemented system, comprising: receiving, at an Operational Insights and Development Recommendation (OIDR) system, developments artifacts from a central artifacts repository; receiving, at the OIDR system, statistical data from a central data analysis infrastructure, wherein the statistical data is retrieved from application systems running software created out of the development artifacts; correlating, the statistical data with the development artifacts; and providing, by the OIDR system, data insights and recommendations to an enhanced IDE based on the correlated statistical data and development artifacts, wherein the recommendations are derived using an analysis algorithm.

The foregoing and other described implementations can each, optionally, include one or more of the following features:

A first feature, combinable with any of the following features, wherein the development artifacts comprises artifact definitions, attributes and information about artifact dependencies.

A second feature, combinable with any of the previous or following features, wherein the data insights and recommendations are displayed in views of the enhanced IDE and are used to edit the development artifacts.

A third feature, combinable with any of the previous or following features, wherein the central artifacts repository comprises development artifacts that are pushed from a local repository associated with the enhance IDE and are synchronized with development artifacts displayed and edited in one or more editors of the enhanced IDE.

A fourth feature, combinable with any of the previous or following features, wherein the central data analysis infrastructure comprises a monitoring system and a monitoring statistics database, wherein the monitoring system collects statistical data from application systems and stores the collected statistical data to the monitoring statistics database.

A fifth feature, combinable with any of the previous or following features, further comprising the monitoring system determines data insights associated with a usage of the development artifacts by end users, wherein the data insights are determined by calculating statistical values of the statistical data.

A sixth feature, combinable with any of the previous or following features, further comprising the monitoring system enhancing the statistical data by artifacts runtime and development artifact ID.

A seventh feature, combinable with any of the previous or following features, before receiving developments artifacts at an OIDR system from a central artifacts repository: further comprising receiving, at application systems, development artifacts from a local repository that is associated with an enhanced IDE; and correlating the development artifacts with statistical data collected from the application systems.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time", "real time", "realtime", "real (fast) time (RFT)", "near(ly) real-time (NRT)", "quasi real-time" or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus", "computer", or "electronic computer device" (or an equivalent term as understood by one of ordinary skill in the art) refer to data processing hardware. Data processing hardware encompass all kinds of apparatuses, devices, and machines for processing data, including by way of example, a programmable processor, a computer, or multiple processors or computers. The computer can also be, or further include special purpose logic circuitry, for example, a central processing unit (CPU), a field programmable gate array (FPGA), or an application-specific integrated circuit (ASIC). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface", or "GUI", can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure.

Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving, at an Operational Insights and Development Recommendation (OIDR) system, developments artifacts from a central artifacts repository;
   receiving, at the OIDR system, statistical data from a central data analysis infrastructure, wherein the statistical data is retrieved from application systems running software created out of the development artifacts;
   correlating, the statistical data with the development artifacts; and
   providing, by the OIDR system, data insights and recommendations to an enhanced integrated development environment (IDE) based on the correlated statistical data and development artifacts, wherein the recommendations are derived using an analysis algorithm.

2. The computer-implemented method of claim 1, wherein the development artifacts comprises artifact definitions, attributes and information about artifact dependencies.

3. The computer-implemented method of claim 1, wherein the data insights and recommendations are displayed in views of the enhanced IDE and are used to edit the development artifacts.

4. The computer-implemented method of claim 1, wherein the central artifacts repository comprises development artifacts that are pushed from a local repository associated with the enhance IDE and are synchronized with development artifacts displayed and edited in one or more editors of the enhanced IDE.

5. The computer-implemented method of claim 1, wherein the central data analysis infrastructure comprises a monitoring system and a monitoring statistics database, wherein the monitoring system collects statistical data from application systems and stores the collected statistical data to the monitoring statistics database.

6. The computer-implemented method of claim 5, further comprising the monitoring system determines data insights associated with a usage of the development artifacts by end users, wherein the data insights are determined by calculating statistical values of the statistical data.

7. The computer-implemented method of claim 5, further comprising the monitoring system enhancing the statistical data by artifacts runtime and development artifact ID.

8. The computer-implemented method of claim 1, further comprising:
   before receiving developments artifacts at an OIDR system from a central artifacts repository:
      receiving, at application systems, development artifacts from a local repository that is associated with an enhanced IDE; and
      correlating the development artifacts with statistical data collected from the application systems.

9. A non-transitory, computer-readable medium storing one or more instructions executable by a computer system to perform operations comprising:
   receiving, at an Operational Insights and Development Recommendation (OIDR) system, developments artifacts from a central artifacts repository;
   receiving, at the OIDR system, statistical data from a central data analysis infrastructure, wherein the statistical data is retrieved from application systems running software created out of the development artifacts;
   correlating, the statistical data with the development artifacts; and
   providing, by the OIDR system, data insights and recommendations to an enhanced integrated development environment (IDE) based on the correlated statistical data and development artifacts, wherein the recommendations are derived using an analysis algorithm.

10. The non-transitory, computer-readable medium of claim 9, wherein the development artifacts comprises artifact definitions, attributes and information about artifact dependencies.

11. The non-transitory, computer-readable medium of claim 9, wherein the data insights and recommendations are displayed in views of the enhanced IDE and are used to edit the development artifacts.

12. The non-transitory, computer-readable medium of claim 9, wherein the central artifacts repository comprises development artifacts that are pushed from a local repository associated with the enhance IDE and are synchronized with development artifacts displayed and edited in one or more editors of the enhanced IDE.

13. The non-transitory, computer-readable medium of claim 9, wherein the central data analysis infrastructure comprises a monitoring system and a monitoring statistics database, wherein the monitoring system collects statistical data from application systems and stores the collected statistical data to the monitoring statistics database.

14. The non-transitory, computer-readable medium of claim 13, further comprising the monitoring system determines data insights associated with a usage of the development artifacts by end users, wherein the data insights are determined by calculating statistical values of the statistical data.

15. The non-transitory, computer-readable medium of claim 13, further comprising the monitoring system enhancing the statistical data by artifacts runtime and development artifact ID.

16. The non-transitory, computer-readable medium of claim 9, further comprising:
   before receiving developments artifacts at an OIDR system from a central artifacts repository:
      receiving, at application systems, development artifacts from a local repository that is associated with an enhanced IDE; and
      correlating the development artifacts with statistical data collected from the application systems.

17. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
      receiving, at an Operational Insights and Development Recommendation (OIDR) system, developments artifacts from a central artifacts repository;
      receiving, at the OIDR system, statistical data from a central data analysis infrastructure, wherein the statistical data is retrieved from application systems running software created out of the development artifacts;

correlating, the statistical data with the development artifacts; and providing, by the OIDR system, data insights and recommendations to an enhanced integrated development environment (IDE) based on the correlated statistical data and development artifacts, wherein the recommendations are derived using an analysis algorithm.

18. The computer-implemented system of claim 17, wherein the development artifacts comprises artifact definitions, attributes and information about artifact dependencies.

19. The computer-implemented system of claim 17, wherein the data insights and recommendations are displayed in views of the enhanced IDE and are used to edit the development artifacts.

20. The computer-implemented system of claim 17, wherein the central artifacts repository comprises development artifacts that are pushed from a local repository associated with the enhance IDE and are synchronized with development artifacts displayed and edited in one or more editors of the enhanced IDE, and wherein the central data analysis infrastructure comprises a monitoring system and a monitoring statistics database, wherein the monitoring system collects statistical data from application systems and stores the collected statistical data to the monitoring statistics database.

* * * * *